US006752860B1

United States Patent
Hoydal et al.

(10) Patent No.: US 6,752,860 B1
(45) Date of Patent: Jun. 22, 2004

(54) APPARATUS FOR SEPARATION OF A FLUID FLOW, ESPECIALLY INTO A GAS PHASE AND A LIQUID PHASE

(75) Inventors: Jan Hoydal, Stavanger (NO); David Stanbridge, Arnhem (NL)

(73) Assignee: Statoil ASA (NO)

(*) Notice: Subject to any disclaimer, the term of this patent is extended or adjusted under 35 U.S.C. 154(b) by 0 days.

(21) Appl. No.: 10/019,602

(22) PCT Filed: Jun. 27, 2000

(86) PCT No.: PCT/NO00/00224
  § 371 (c)(1),
  (2), (4) Date: Aug. 9, 2002

(87) PCT Pub. No.: WO01/00296
  PCT Pub. Date: Jan. 4, 2001

(30) Foreign Application Priority Data

Jun. 28, 1999 (NL) .............................................. 1012451

(51) Int. Cl.[7] .............................................. B01D 19/00
(52) U.S. Cl. .............................. 96/157; 96/207; 96/215; 96/208; 96/216; 96/189; 95/258; 95/261; 166/105.5
(58) Field of Search .......................... 96/157, 190, 207, 96/208, 214, 215, 216, 189, 188, 217, 184; 95/258, 261; 55/457; 210/787, 512.1, 512.3; 166/267, 105.5

(56) References Cited

U.S. PATENT DOCUMENTS

| | | | | | |
|---|---|---|---|---|---|
| 4,199,332 | A | * | 4/1980 | Krohn et al. | 96/208 |
| 4,429,581 | A | | 2/1984 | Furmaga | |
| 4,997,464 | A | * | 3/1991 | Kopf | 96/6 |
| 6,290,738 | B1 | * | 9/2001 | Holm | 55/309 |

OTHER PUBLICATIONS

European Publication No. 0 326 231 A1 (Aug. 2, 1989).
International Publication No. WO 95/03868 (Feb. 9, 1995).

* cited by examiner

Primary Examiner—Duane Smith
Assistant Examiner—D. J. Theisen
(74) Attorney, Agent, or Firm—Pitney Hardin LLP

(57) ABSTRACT

An apparatus for separation of the fluid flow flowing through a pipeline into a light fraction and a heavier fraction has a tubular casing (2) arranged to constitute a section of the pipeline proper, a spin element (5) for rotation of the fluid flow at the upstream end of the casing (2), and a discharge element (12) downstream of the spin element (5) having opening (13) for discharge of the light fraction and possibly entrained heavier fraction. The apparatus also has a control separator (25) connected to the discharged element (12) and arranged to separate entrained heavier fraction from the light fraction, and a control system including a level transmitter (42) indicating the level of separate heavier fraction in the separator, and a level control unit (43) connected to the level transmitter (42) and to a drain valve (40, 41) in a separator outlet (28) for the light fraction.

9 Claims, 3 Drawing Sheets

Figure 1:
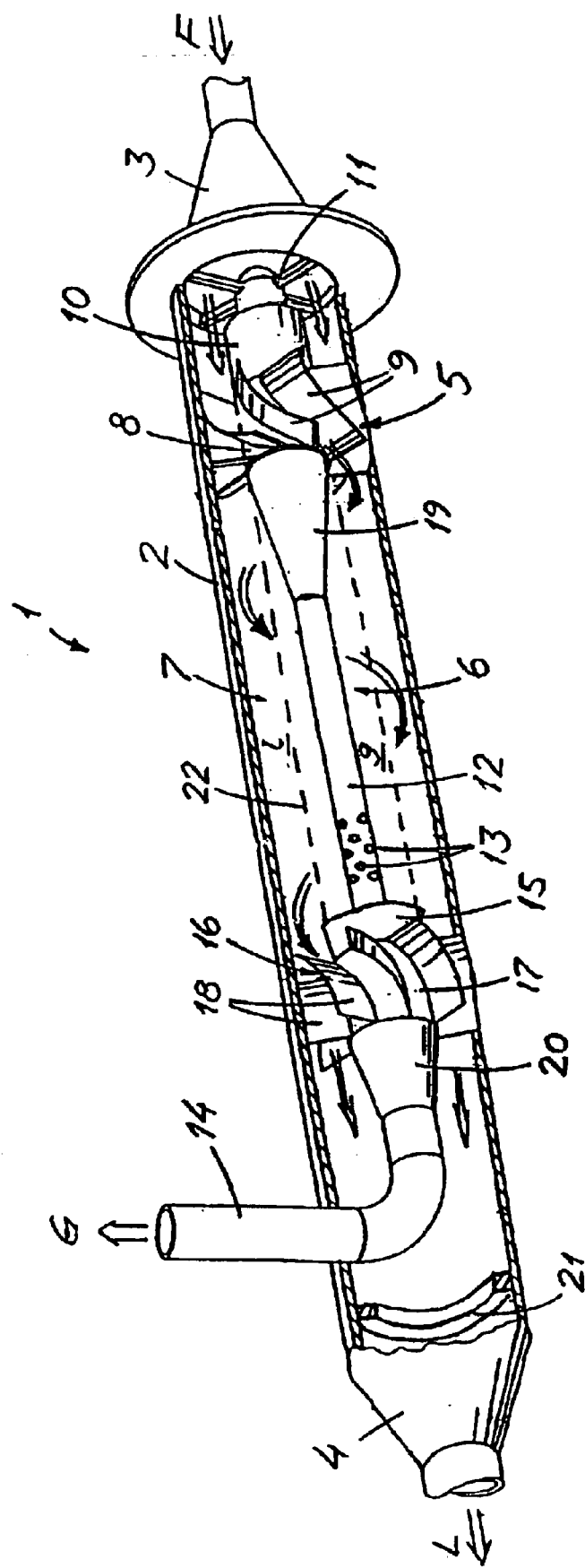

APPARATUS FOR SEPARATION OF A FLUID FLOW, ESPECIALLY INTO A GAS PHASE AND A LIQUID PHASE

The invention relates to an apparatus for separation of a liquid flow flowing through a pipeline into a light fraction and a heavier fraction, in which the fluid flow is set into rotation so that it is separated into a central zone essentially containing the light fraction, and an outer annular zone essentially containing the heavier fraction, and from which the fluid in the central zone and the fluid in the outer zone are discharged via respective outlet means.

In offshore extraction of hydrocarbons (oil and gas) the produced fluids are often transported in relatively long pipelines and risers up from the sea bed to the relevant production platform. The produced fluid usually consists of liquid (oil and water) in which gas is dissolved Since the pressure in the underground source is higher than in the pipeline, and in addition decreases upwards in the pipeline, an increasing gas bubble formation and thereby two-phase flow arises in the pipeline. This implies a pulsatory flow (so-called slugging) which in many cases causes serious vibrations in the pipeline.

It is known to separate the fluid flow into liquid and gas by utilising cyclone techniques as stated in the introduction, to reduce the vibrations resulting from gas bubbles. However, the known cyclone techniques imply turbulent pressure variations in the fluid, something which causes vibrations in the outlet pipe for the gas. These vibrations may result in considerable damage, and the separation degree may also be influenced in an unfavourable manner because of the pressure vibrations.

A general object of the invention is to provide an apparatus which is able to separate a fluid flow in a light fraction and a heavier fraction by utilising "in line" technology in a pipeline to carry out the relevant separation work.

A more particular object of the invention is to provide such an apparatus which is suitable for efficient in-line separation of a fluid flow into a gas phase and a liquid phase, so that the flow regime in the pipeline changes from a serious pulsatory flow (slugging) to an easily manageable bubble flow.

An additional object of the invention is to provide such an apparatus which is provided with a control system securing an optimum separation operation of the apparatus.

For achieving the above-mentioned objects there is provided an apparatus of the introductorily stated type which, according to the invention, is characterised in that it comprises an essentially tubular casing arranged to constitute a section of the pipeline proper, a spin element for rotation of the fluid flow being located at the upstream end of the casing, and the outlet means for the central zone comprising a discharge element arranged downstream of the spin element and having entry openings for discharge of the light fraction and possibly entrained heavier fraction from the central zone, a control separator connected to the discharge element and arranged to separate entrained heavier fraction from the light fraction, the separator being provided with an outlet for separated heavier fraction, and an outlet for the light fraction, and a control system comprising a level transmitter for indication of the level of separated heavier fraction in the separator, and a level control unit connected to the level transmitter and to a drain valve in the outlet of the separator for the light fraction, and in cooperation with the valve seeing that the separated heavier fraction in the separator being kept at a constant level corresponding to the maximum allowed, entrained quantity of the heavier fraction in the light fraction.

With the present invention there is provided an apparatus which uses in-line technology to separate a fluid flow in a pipeline. The apparatus is based on the cyclone principle and preferably will be provided with axial spin elements simplifying the in-line method in that the supplied fluid flow and at least one of the separated fluid fractions may flow in the pipeline direction axially into and out of the tubular casing. In this manner the casing may be simply installed in a straight pipeline stretch without any substantial modification of the existing pipe geometry.

The advantages of such a construction, as compared to other analogous separation technology, are:
1. A low weight in relation to e.g. conventional separators and gas scrubbers.
2. Low construction costs in relation to e.g. conventional separators and gas scrubbers.
3. The apparatus may be simply installed in pipe paths having very small physical dimensions. The casing proper in most cases will not have a larger diameter than the connection pipes.
4. The apparatus in most cases can be constructed within the pipe specifications in force without having to take into account the stalled pressure tank code, so that pressure tank protecting equipment may be avoided. Existing technology often suffers from the fact that one does not manage to avoid the pressure tank code.

A relevant application of the apparatus according to the invention will be to separate hydrocarbon gas from produced water on an oil production platform, so that a serious two phase flow (slugging) in the produced water-pipeline is eliminated. The apparatus enables the gas to be separated from the water in a simple and compact manner in addition, the separated gas may be recovered instead of being bunt off in the flare of the platform. The result is saved $CO_2$ expenses.

A very essential possible field of use of the apparatus will be to separate a well flow directly in the flow line from the well, either on the platform in question, under water or down in the well. An axial feed flow into the tubular casing of the apparatus reduces the constructional dimensions considerably and enables an installation which does not have a lager diameter than the flow line proper. This type of application will relieve the gas separation process of the platform The well production is often limited because of the gas capacity of conventional separators. By separating the gas from the well flow upstream of the separator train, the total gas quantity into the separator train will decrease, and the bottleneck is abolished. The gas may be conducted outside of the separator tram directly to e.g. reinjection.

The apparatus according to the invention will also be able to be used to separate free water from oil, e.g. as a dewatering cyclone. A typical application will be an installation in the flow line upstream of the choke valve of the well, where possibly present water often will be in a separate free phase. The advantages will be evident, since large quantities of produced water into the separator train occupy separation capacity and easily form bottlenecks. This is often a great problem on older oil fields where the portion of water may amount to more than 90% of the well flow. By bulk separating this water upstream of the separator train, the bottlenecks will be able to be abolished. The dewatering cyclone will have a great potential installed downhole in an oil well having a high water content A high water content reduces the lifting capacity of the well, often down to a profitless level whereafter the well is shut off. By separating the water from oil downhole, the lifting capacity will be maintained, and a continued production is made possible. By using this technology, the utilisation factor proper of an oil field will be able to be raised considerably.

Seabed installations in flow lines and transport pipes will also be a possibility for this technology.

Figure 2:
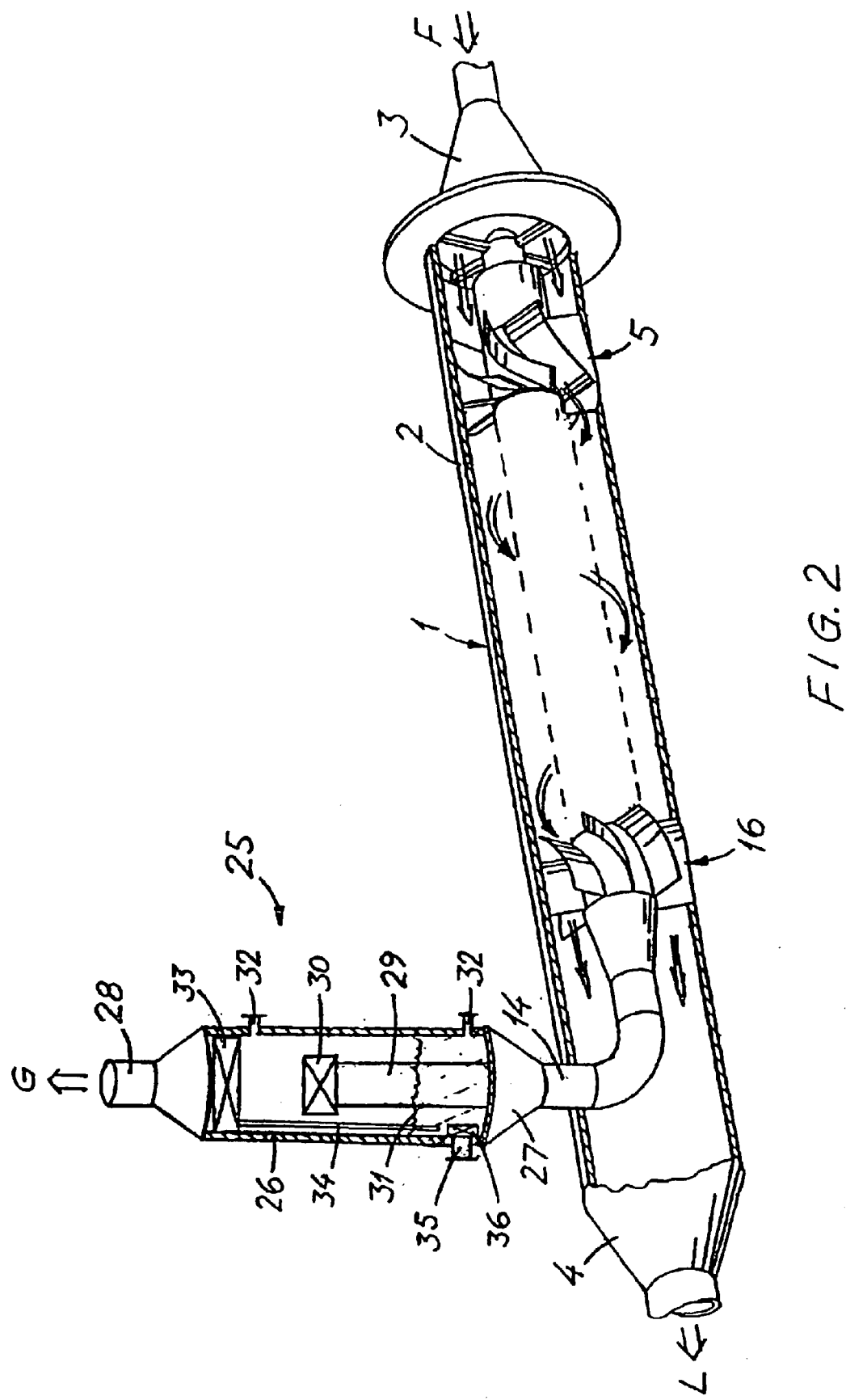
Figure 3:
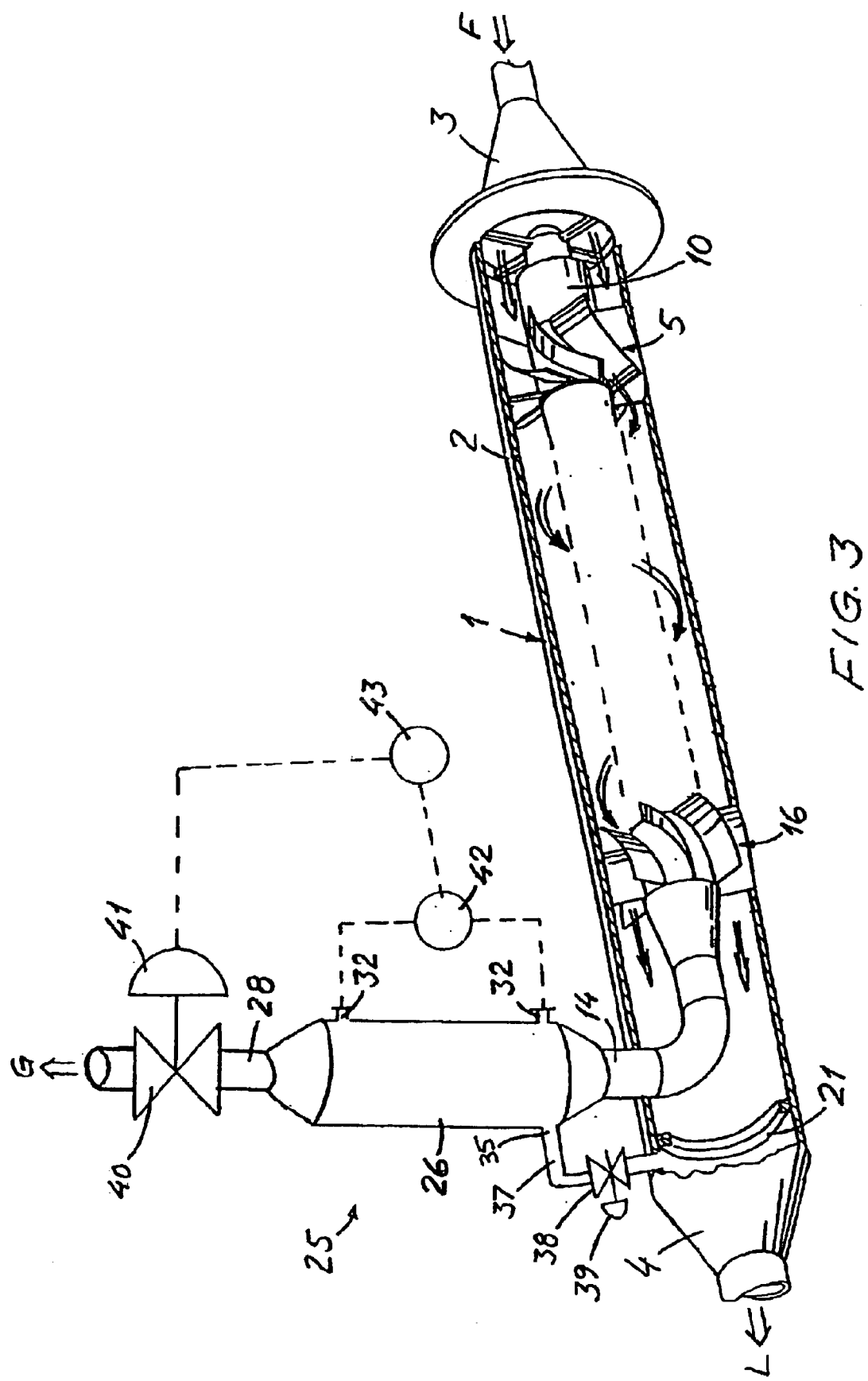

The invention will be further described below in connection with exemplary embodiments with reference to the drawings, wherein FIG. 1 shows a partly axially sectioned, perspective side view of an embodiment of the casing part of an apparatus according to the invention;

FIG. 2 shows partly a view corresponding to FIG. 1, with internal components partly left out, and partly an embodiment of the control separator of the apparatus; and FIG. 3 shows a view essentially corresponding to FIG. 2, wherein also the control system of the apparatus shown.

The embodiment of the apparatus according to the invention shown in the drawings is especially intended for separation of a gas phase (gas/vapour) from a liquid phase (water/oil), for example in a pipeline leading to an oil platform As shown in FIG. 1, which shows the degasser section of the apparatus, this section comprises a cylindrical, tubular casing 2 which is intended for connection in a pipeline (not shown) so that the casing constitutes a part (an in-line element) of the pipeline proper. The casing 2 has an inlet part 3 for the supply of the two-phase mixture F of liquid and gas/vapour, and an outlet part 4 wherein the liquid phase L leaves the casing 2, in both cases in the axial direction of the casing. Both the inlet part 3 and the outlet part 4 here are shown to be conical, but these parts could of course also have another shape, for example cylindrical shape with the same diameter as the pipeline, or possibly a larger or smaller diameter.

At the upstream end of the casing 2 there is mounted an axial spin element 5 to set the two-phase mixture into rotation by rotation of the element, for achieving the desired separation of the two-phase mixture into a gas/vapour core "g" in a central zone 6 in the casing 2, and liquid "l" in an annular outer zone 7 at the inner surface of the casing. The spin element comprises a core body 8 on which there are mounted a number of axially curved guide blades 9. The number of blades, and the configuration thereof with respect to length and angle, will be adapted to the topical application.

Upstream of the spin element 5 there is arranged a cylindrical guide body 10 which is designed to guide the supplied fluid in an annular axial flow towards the spin element. The guide body 10 is supported centrally in the casing 2 by means of a supporting means 11. The guide body and the supporting means preferably are aerodynamically shaped.

Centrally in the casing 2 there is arranged a discharge element 12 in the form of a hollow body which is provided with one or more openings 13 for the discharge of gas and possibly entrained liquid from the central zone 6 and out of the degasser part. As shown, the gas G is conducted via an outlet pipe 14 communicating with the discharge element 12 and being carried laterally through the casing 2.

In the illustrated embodiment the discharge element 12 comprises a pipe extending axially along the casing 2 and being provided with a number of openings 13 in the form of slots arranged upstream of a reflector element 15 for the gas. The geometry, size and placing of the slots may vary.

The reflector element 15 consists of a cylindrical core body which, in the illustrated embodiment, has a planar surface which is directed towards the central gas zone. However, the reflector element may be designed in other ways, for example as a plug or cone tapering in the upstream direction.

Downstream of the reflector element 15, and at a distance upstream of the outlet part 4 of the casing, there is arranged an anti-spin element 16 to bring the rotating liquid phase flow back to an axially directed flow towards the outlet part 4. The anti-spin element comprises a core body 17 on which there are mounted a number of partly curved guide blades 18 which are directed axially along the casing at their outlet end. At their radially outer edges, the blades 18 are fixed to the inside of the casing, so that the element 16 is stably supported in the casing, and thereby forms a support for the discharge pipe 12 and the reflector element 15.

As appears, the discharge pipe 12 extends through the reflector element 15 and the core body 17, and further the pipe at its upstream end is supportingly connected to a transfer cone 19 connected to the core body 8 of the spin element 5. A transfer cone 20 is also arranged at the downstream side of the anti-spin element 16, as a preferably streamlined transition between the anti-spin element and the axial part of the outlet pipe 14.

Near the outlet part 4 of the casing 2 there is arranged a flow restriction 21 for creating a pressure drop downstream of the restriction. The purpose of this pressure drop is to be further mentioned below, in connection with the control separator of the apparatus.

When the spin element 5 is set into rotation in operation of the apparatus, the fluid flow F, as mentioned, is separated into a gas/vapour core "g" in the central zone 6, and liquid "l" in a annular zone 7 inside of the casing wall. The gas/vapour core typically is established between the cone 19 and the reflector element 15. This core normally will be established inside of a defined boundary surface 22 between the gas/vapour and the liquid. The separated gas/vapour, possibly together with some entrained liquid, especially under unstable conditions, is drained off via the discharge element 12, whereas the liquid phase passes the reflector element 15 in a rotating annular flow and is brought back to axial flow in the anti-spin element 16. In addition to reflecting the gas, the reflector element will also take part in controlling pressure recovery upstream of the anti-spin element. As regards the anti-spin element, this may possibly be omitted. However, this result in that the spin is not abolished, and also in a poorer pressure recovery.

An embodiment of the control separator of the apparatus is shown in FIG. 2. The control separator has two functions, viz. to secondarily separate liquid from the gas phase coming from the degasser part 1, and to control the working point of the degasser part, and then in co-operation with the control system, as further described below.

FIG. 2 shows a control separator 25 comprising an outer shell in the form of a vertically oriented, cylindrical container 26 which, at its lower end, is connected to the outlet pipe 14 of the degasser via a suitable transition member 27, and which has an outlet 28 for gas at its upper end.

The mounting of the control separator typically will be vertical, independent of vertical or horizontal version of the degasser part itself. With a horizontally oriented degasser, the control separator will be built together with the degasser as a large T-piece. With a vertical degasser, the control separator typically will be mounted next to the degasser proper, or internally integrated in the degasser itself.

The outer shell of the control separator preferably has a circular cross-section, as shown, but may possibly have another shape. The shell suitably may have the same diameter as the degasser casing 2, since this implies that the degasser casing and the control separator can be executed as a T-piece having similar pipe diameters, where the shell is mounted directly on the degasser casing, without an intermediate transfer member.

The length/height and diameter of the separator will depend on the dimensions of the internal components of the separator, the dwell time for liquid in the separator, limitations on maximum gas velocity and the ability to cope with dynamic level fluctuations.

An inlet pipe 29 for the supply of gas and entrained liquid to the separator 25 is connected at its lower end to the outlet pipe 14 from the degasser part and extends a distance upwards within the container 26. At its upper end the inlet pipe is coupled to a typical inlet element 30 functioning as a moment switch reducing the velocity, the momentum and the inlet impulse of the supplied feed flow (gas and liquid). The energy of the feed flow thereby is reduced in such a manner that separation of liquid from the gas phase is optimised, and so that the liquid in addition is prevented from splashing directly towards the gas outlet 28.

The inlet element 30 may be of a conventional design which will be known to a person skilled in the art, and which is therefore not further described.

Liquid which is separated in the container 26, in all essentials is separated gravimetrically, and collects in the lower part of the container. The liquid in FIG. 2 is shown to have a level 31. Further, the container is shown to be provided with a pair of connecting pieces 32 for level measurement. The level may be measure by means of e.g. differential pressure measurement or another measuring principle, by using an external vertical measuring pipe or standpipe (not shown). Alternatively, there may be used other level measuring principles which do not need connecting piece connections, for example inductive, acoustic or radioactive methods.

In the illustrated embodiment, at the upper end of the container 26, there is arranged a coalescer and gas outlet means 33 having the task to separate the smallest liquid droplets from the gas flowing towards the outlet 28, and which will also contribute to preventing liquid from splashing directly towards the outlet This means for example may consist of standard pallet rings, wire mesh or cyclones. Further, there is shown to be arranged a drainage pipe 34 to conduct separated liquid from the coalescer into the liquid phase of the control separator.

The illustrated coalescer/gas outlet means 33 does not need to be provided in order to make the control separator function, but is preferable in order to obtain optimum separator efficiency.

The container 26 at its lower end (possibly at the bottom) is provided with an outlet 35 for drainage of the liquid to a suitable place. In connection with the outlet 35 there is also shown to be arranged a liquid outlet means 36 which mainly has the function to create optimum drainage properties, among other things by preventing turbulent flow towards the outlet 35. However, the control separator will function also without such a means.

As appears from FIG. 3, the outlet 35 in the illustrated embodiment is coupled to a drainage line 37 connected to the outlet part 4 of the degasser part 1 at the downstream side of the constriction 21, the constriction producing a sufficient pressure drop to drain liquid from the control separator to the outlet part 4.

On the drainage line 37 there is connected a regulating valve 38 which may be controlled via a manual control unit 39 for adjustment of a suitable desired drainage velocity, as further mentioned below in connection with the control system of the apparatus.

As further shown in FIG. 3, in the gas outlet 28 from the container 26, there is connected a valve 40 having an operating unit 41 for adjustment of the delivered or discharged gas quantity from the separator 25.

As mentioned above, the control separator 25 controls the working point of the degasser part in co-operation with the control system of the apparatus. This takes place in that said working point is controlled by means of an indirect method, by means of level measurement. In the illustrated embodiment the control system comprises in substance a level transmitter 42 which is connected to the connecting pieces 32 and which indicates the level of separated liquid in the container 26, and a level control unit 43 which is connected to the level transmitter 42 and to the operating unit 41 of the valve 40, and which controls the level of liquid in the container in co-operation with the valve 40.

The optimum working point for the degasser part will be when the liquid is approximately free of gas in the outlet part 4 of the degasser, and the gas is approximately free of liquid in the outlet pipe 14. At this working point, entrained liquid in the gas phase will increase considerably if one tries to extract more gas. Maintenance of this working point requires an efficient control system The control separator together with the illustrated control system will allow a given maximum quantity of liquid in the gas phase from the degasser part, and will see to it that this small liquid portion is separated from the gas before it is let out of the separator. By means of this method one will in fact obtain two approximately clean phases of gas and liquid.

As mentioned, the drainage velocity for liquid from the control separator is adjusted or set by means of the regulating valve 38. The drainage velocity implicitly will correspond to the allowed quantity of liquid entrained in the gas phase from the degasser part. The drainage velocity may be controlled by means of the manual control unit 39. A more sophisticated manner will be to let the opening of the valve be a function of gas or liquid load. The drainage quantity will increase with increasing load if, for example, one requires a constant liquid fraction in the gas quantity from the degasser. It is then natural that allowed drainage quantity is increased to the same degree. A downstream quantity measurement of either the liquid or gas will, by way of a given function, be able to give the correct valve opening.

The level transmitter 42, which measures the liquid level in the container 26, should be quick and have a rapid updating because of the quick dynamic response of the degasser part. The level transmitter delivers a signal to the level control unit 43 which controls the level by means of the valve 40. With an increasing degree of opening of the valve 40, a larger quantity of gas will be withdrawn from the degasser. Consequently, a larger fraction of liquid will be entrained in the gas flow from the degasser. Close to the optimum point where approximately all gas is separated from the liquid in the degasser, one will very easily get a larger liquid entrainment with an additional opening of the valve 40. This is a result of the fact that the gas core in the degasser is thinner the closer one is to the optimum point for complete separation, and the distance between the gas/liquid boundary surface 22 and the openings 13 is smallest. With a little distance between boundary surface and openings, a massive entrainment situation arises very easily if the gas drainage is further increased.

With a stable level in the control separator, the entrained liquid quantity in the gas phase from the degasser will be constant and equal to the maximally allowed, entrained liquid quantity given by the regulating valve 38.

The level control unit 43 all the time will see to it that entrained liquid quantity in the gas phase from the degasser will be approximately constant.

What is claimed is:

1. An apparatus for separation of a fluid flowing through a pipeline into a light fraction and a heavier fraction, in which a fluid flow is set into rotation so that said fluid flow is separated into a central zone (6) essentially containing the light fraction, and an outer annular zone (7) essentially containing the heavier fraction, and from which the fluid in the central zone and the fluid in the outer zone are discharged via respective outlet means (12–14 resp. 4), characterised in that said apparatus comprises

- an essentially tubular casing (2) arranged to constitute a section of the pipeline proper, a spin element (5) for rotation of the fluid flow being located at the upstream end of the casing (2), and the outlet means for the central zone comprising a discharge element (12) arranged downstream of the spin element (5) and having openings (13) for discharge of the light fraction and possibly entrained heavier fraction from the central zone (6),
- a control separator (25) connected to the discharge element (12) and arranged to separate entrained heavier fraction from the light fraction, the separator (25) being provided with an outlet (35) for separated heavier fraction, and an outlet (28) for the light fraction, and
- a control system comprising a level transmitter (42) for indication of the level of separated heavier fraction in the separator (25), and a level control unit (43) connected to the level transmitter (42) and to a valve (40, 41) in the outlet (28) of the separator for the light fraction, and in cooperation with the valve seeing that the separated heavier fraction in the separator (25) being kept at a constant level (31) corresponding to the maximally allowed, entrained quantity of the heavier fraction in the light fraction.

2. An apparatus according to claim 1, characterised in that, in the casing (2) upstream of the spin element (5), there is arranged a guide body (10) which is designed to guide the supplied fluid (F) in an annular axial flow towards the spin element (5), and that the outlet means (4) for the heavier fraction is arranged to carry this fraction out of the casing (2) in the axial direction of the casing.

3. An apparatus according to claim 1, characterised in that the discharge element comprises a pipe (12) running axially in the casing (2) and being provided with openings (13) in the form of a plurality of slots arranged in a region of the pipe (12) upstream of a reflector element (15) for the light fraction arranged in the casing (2).

4. An apparatus according to claim 1, characterised in that an anti-spin element (16) for the heavier fraction in the outer zone (7) is arranged upstream of the outlet means (4) for the heavier fraction.

5. An apparatus according to claim 3, characterised in that the spin element (5) and the anti-spin element (16) comprise respective core bodies (8 resp. 17) for supporting the components in the casing (2), and that the discharge pipe (12) at its upstream end is connected to the core body (8) of the spin element (5) and at its downstream end extends through the core body (17) of the anti-spin element (16) and passes into an outlet member (14) carried laterally through the casing (2).

6. An apparatus according to claim 1, wherein the light fraction is gas/vapour and the heavier fraction is a liquid, characterised in that in the control separator (25) comprises a vertically oriented container (26) which, at its lower end, is connected to the discharge element (12) arranged in the casing (2), and which has an outlet (28) for gas at its upper end, the discharge element (12) being connected to the lower end of an inlet pipe (29) leading to a coalescer and gas outlet means (30).

7. An apparatus according to claim 6, characterised in that the liquid outlet (35) of the control separator (25) is connected through a drainage line (37) with the outlet means (4) of the casing (2) at the downstream side of the flow restriction (21) arranged in the casing (2).

8. An apparatus according to claim 7, characterised in that the drainage line (37) is provided with a regulating valve (38) for adjustment of the drainage velocity.

9. An apparatus according to claim 4, characterised in that the spin element (5) and the anti-spin element (16) comprise respective core bodies (8 resp. 17) for supporting the components in the casing (2), and that the discharge pipe (12) at its upstream end is connected to the core body (8) of the spin element (5) and at its downstream end extends through the core body (17) of the anti-spin element (16) and passes into an outlet member (14) carried laterally through the casing (2).

* * * * *